United States Patent
Reddy

(10) Patent No.: US 9,021,294 B2
(45) Date of Patent: Apr. 28, 2015

(54) DISCOVERING BOOT ORDER SEQUENCE OF SERVERS BELONGING TO AN APPLICATION

(75) Inventor: Chandra Reddy, San Ramon, CA (US)

(73) Assignee: Sungard Availability Services LP, Wayne, PA (US)

(*) Notice: Subject to any disclaimer, the term of this patent is extended or adjusted under 35 U.S.C. 154(b) by 471 days.

(21) Appl. No.: 13/422,091

(22) Filed: Mar. 16, 2012

(65) Prior Publication Data

US 2013/0246838 A1    Sep. 19, 2013

(51) Int. Cl.
G06F 11/00    (2006.01)
G06F 11/14    (2006.01)
G06F 11/20    (2006.01)
H04L 12/24    (2006.01)
H04L 12/26    (2006.01)

(52) U.S. Cl.
CPC ........ G06F 11/1484 (2013.01); G06F 11/2028 (2013.01); H04L 41/0213 (2013.01); H04L 41/048 (2013.01); H04L 41/0659 (2013.01); H04L 41/12 (2013.01); H04L 43/0817 (2013.01)

(58) Field of Classification Search
None
See application file for complete search history.

(56) References Cited

U.S. PATENT DOCUMENTS

| | | | |
|---|---|---|---|
| 7,430,744 B2 | 9/2008 | Straube et al. | |
| 7,480,822 B1 * | 1/2009 | Arbon et al. | 714/13 |
| 8,700,946 B2 * | 4/2014 | Reddy et al. | 714/4.11 |
| 2007/0027973 A1 | 2/2007 | Stein et al. | |
| 2007/0067435 A1 | 3/2007 | Landis et al. | |
| 2008/0010631 A1 * | 1/2008 | Harvey et al. | 717/131 |
| 2009/0125758 A1 * | 5/2009 | Anuszczyk et al. | 714/48 |
| 2010/0046395 A1 * | 2/2010 | Sivaramakrishna Iyer et al. | 370/254 |
| 2011/0126197 A1 | 5/2011 | Larsen et al. | |
| 2011/0161851 A1 | 6/2011 | Barber et al. | |
| 2012/0030503 A1 * | 2/2012 | Li et al. | 714/4.11 |
| 2013/0275808 A1 * | 10/2013 | McNeeney et al. | 714/20 |

* cited by examiner

Primary Examiner — Scott Baderman
Assistant Examiner — Jason Bryan
(74) Attorney, Agent, or Firm — Cesari and McKenna, LLP

(57) ABSTRACT

A survey tool for use in a Recover to Cloud (R2C) replication service environment that determines configuration information automatically (such as through SNMP messaging or custom APIs) and stores it in a survey database. A Virtual Data Center (VDC) representation is then instantiated from the survey database, with the VDC being a virtual replica of the production environment including dormant Virtual Machine (VM) definition files, applications, storage requirements, VLANs firewalls, and the like. The survey tool determines the order in which the replicas are brought on line to ensure orderly recovery, by determining the order in which each machine makes requests for connections to other machines.

17 Claims, 7 Drawing Sheets

| RECOVERY ORDER | SERVER NAME |
|---|---|
| 1 | A |
| 2 | B |
| 2 | C |
| 2 | D |
| 3 | E |
| 3 | F |
| 3 | G |
| 0 | H |
| 0 | I |
| 0 | J |

Rows with order 2 (B, C, D): RECOVERED TOGETHER
Rows with order 0 (H, I, J): RECOVER AT ANY TIME

FIG. 6

DISCOVERING BOOT ORDER SEQUENCE OF SERVERS BELONGING TO AN APPLICATION

BACKGROUND

Replication of data processing systems to maintain operational continuity is now required almost everywhere. The costs incurred during downtime when information technology equipment and services are not available can be significant, and sometimes even cause an enterprise to halt operations completely. With replication, aspects of data processing machines that may change rapidly over time, such as their program and data files, physical volumes, file systems, etc. are duplicated on a continuous basis. Replication may be used for many purposes such as assuring data availability upon equipment failure, site disaster recovery or planned maintenance operations.

Replication may be directed to either the physical or virtual processing environment and/or different abstraction levels. For example, one may undertake to replicate each physical machine exactly as it exists at a given time. However, replication processes may also be architected along virtual data processing lines, with corresponding virtual replication processes, with the end result being to remove the physical boundaries and limitations associated with particular physical machines.

Use of a replication service as provided by a remote or hosted external service provider can have numerous advantages. Replication services can provide continuous availability and failover capabilities that are more cost effective than an approach which has the data center operator owning, operating and maintaining a complete suite of duplicate machines at its own data center. With such replication services, physical or virtual machine infrastructure is replicated at a remote and secure data center.

In the case of replication services to virtual target, a virtual disk file containing the processor type and configuration, operating system, data, and applications for each data processor in the production environment is created and retained in a dormant state. In the event of a disaster, the virtual disk file is moved to a production mode within a Virtual Data Center (VDC) environment at the remote and secure data center. Applications and data can then be accessed on the remote VDC, enabling the service customer to continue operating from the cloud while recovering from a disaster.

From the perspective of the service customer, the replication service provider thus offers a Recover to Cloud (R2C) service that is provided much like an on-demand utility (much like the electricity grid) over a network (typically the Internet). This enables a data center operator to replicate critical servers and applications in his production environment to the cloud, with the VDC environment being activated to bring up the corresponding virtual machines and applications via the cloud in the event of a disaster.

SUMMARY OF PREFERRED EMBODIMENTS

One of the key aspects of recovering an application is understanding what constitutes an application. For example—What are the servers that belong to an application? What are the various networks and subnets on which these servers reside? Another important aspect is to determine the order in which these servers should be recovered. For example, in a typical three tiered application, it is usually necessary for the database servers to be recovered first, then the app servers, and then the web servers. The discovery of the various components of an application and the possible order of recovery of those servers is the focus area of this patent.

Briefly, the present disclosure is directed to a survey tool for use a data processing environment such as a Recover to Cloud (R2C) replication service. The survey tool automatically determines configuration information for a production environment. The configuration information may identify server(s), applications, storage, security and network device information. The configuration information is preferably determined automatically (such as through Simple Network Management Protocol (SNMP) messaging or custom Application Programming Interfaces (APIs) and stored in a configuration survey database. The automatically discovered information may be augmented with manually entered information (such as server names).

A Virtual Data Center (VDC) representation of the production environment is then instantiated from the survey database. The VDC is a virtual replica of the production environment and may include dormant Virtual Machine (VM) definition files, applications, storage requirements, and the like. Changes to the production environment are continuously written to the VDC replica(s). When a disaster occurs in the production environment, the dormant VMs are moved to active status, and the replication service thus on-line a system on line accessible to the customer "in the cloud" that replicates the production environment.

In a usual scenario, the customer's production environment is discovered to have multiple physical and virtual machines. A typical environment could have multiple applications and there could be multiple servers within each application. The survey tool discovers the servers that belong to an application.

The survey tool also discovers a proper order in which the servers belonging to an application should be recovered. This order would be then preserved and used for activating dormant VM replicas for access in the cloud in several ways. One way is to analyze machine in the production environment—specifically looking for the order in which each machine makes requests for connections to other physical or virtual machines. The requests for connections can be detecting using agents that are deployed in the production environment. The agents may in turn spawn other agents to any discovered machines, with the spawning process tree limited by specification of one or more subnets known to contain the servers of interest.

This connection information is used to build a dependency tree that then indicates which machines must be brought on line, and in which order first, when the VDC goes live. This dependency information can also be further refined in other ways, such as by looking at "up time" timestamps in server logs in the production environment.

An application will require more than one server for proper operation. The survey tool described herein automates discovery of various servers that "could" belong to an application, and the order in which those servers "could" be recovered.

In one embodiment, the server discovery tool is a process initiates by identifying one or more server(s) that host the database(s) for the application. One such tool, for example, can be an agent process, referred to as a database agent (DBA), that is deployed on one or more database server(s). The DBA monitors the servers that initiate connections to the database server, recording information to identify those other servers (such as each server's hostname, IP address, whether the connection was persistent or temporary, the number of connections in a given time frame, and so forth).

The DBA may also attempt to identify the type of Operating System (OS) of each connecting server such as a Windows or non-Windows machine. This can be done by using the Windows Management Instrumentation (WMI) protocol, or by using a Secure Shell (ssh) protocol.

The DBA then spawns another agent, called a BOT agent (BOTA), on other servers that initiated connection to the database server. The BOTAs are customized depending on the type of OS determined for the other server (e.g., Windows BOTAs are deployed on Windows machines, Linux BOTAs on Linux machines, and so forth).

BOTAs may then be further spawned to develop a tree of server dependencies. In particular, as the other server(s) detect connection requests from still other servers, this process of logging connections and spawning BOTAs continues.

The spawning of BOTAs is preferably limited by having an administrative user specify one or more subnets addresses for which the servers of interest are known to live, and therefore the extent to which BOTA spawning can stop.

The process is allowed to run for some length of time, such as a week, to ensure that all possible servers associated with an application have attempted connections.

A cleanup process may involve the root level DBA signaling its first level of deployed BOTA's that the server discovery process is ending. This can in turn cause the first level of BOTAs in the tree to inform the next level of BOTAs and so forth down to leaf node BOTAs. Once a BOTA leaf is reached, it reports its list of observed connections up to its parent, and the parent BOTA issues an uninstall command to the leaf BOTA. The parent eventually itself becomes a leaf, and this process repeats until all BOTAs are cleaned and the tree of connections reported to the DBA.

The DBA itself may not be uninstalled until an administrative user is presented with a display of the overall tree showing all of the discovered servers, such as with database server as the root, and the servers interacting with each other and the direction of interaction—only those servers present in the subnets which user specified are displayed in the tree.

Once discovery of the servers belonging to an application is complete, the user can now choose which server(s) are actually critical for the application recovery. Those servers would typically considered for replication and high availability. To determine an order of recovery of the critical servers, the list of connections made to each one is considered as follows.

If two servers (A and B) have never initiated connections to each other, then they are not dependent on each other for recovery order.

If however, a Server A has always initiated a connection to Server B, and B has never initiated a connection to A, then Server B needs to be recovered first.

Finally, if Servers A and B each initiate connections to one another, boot order is considered to determine which server needs to be recovered first. For example, if the system up time of Server B is smaller than the up time for Server A, then Server A "most probably" needs to boot first and then Server B.

There is a possibility of cyclic dependency where the logic could deduce that Server A depends on B, B depends on C, and C depends on A. In these situations the server that has a database installed is assigned a higher weight of being the first to be recovered. A greater weight would be provided to the server that had the longest system up time. The weights of both the presence of database and the weigh of system up time could also be combined to determine the order of recovery.

Using the above logic for pair of servers while traversing the tree, one can therefore discover the correct order in which servers need to be recovered.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 6 is an example server recovery table.

DETAILED DESCRIPTION OF EXAMPLE EMBODIMENTS

Figure 1:
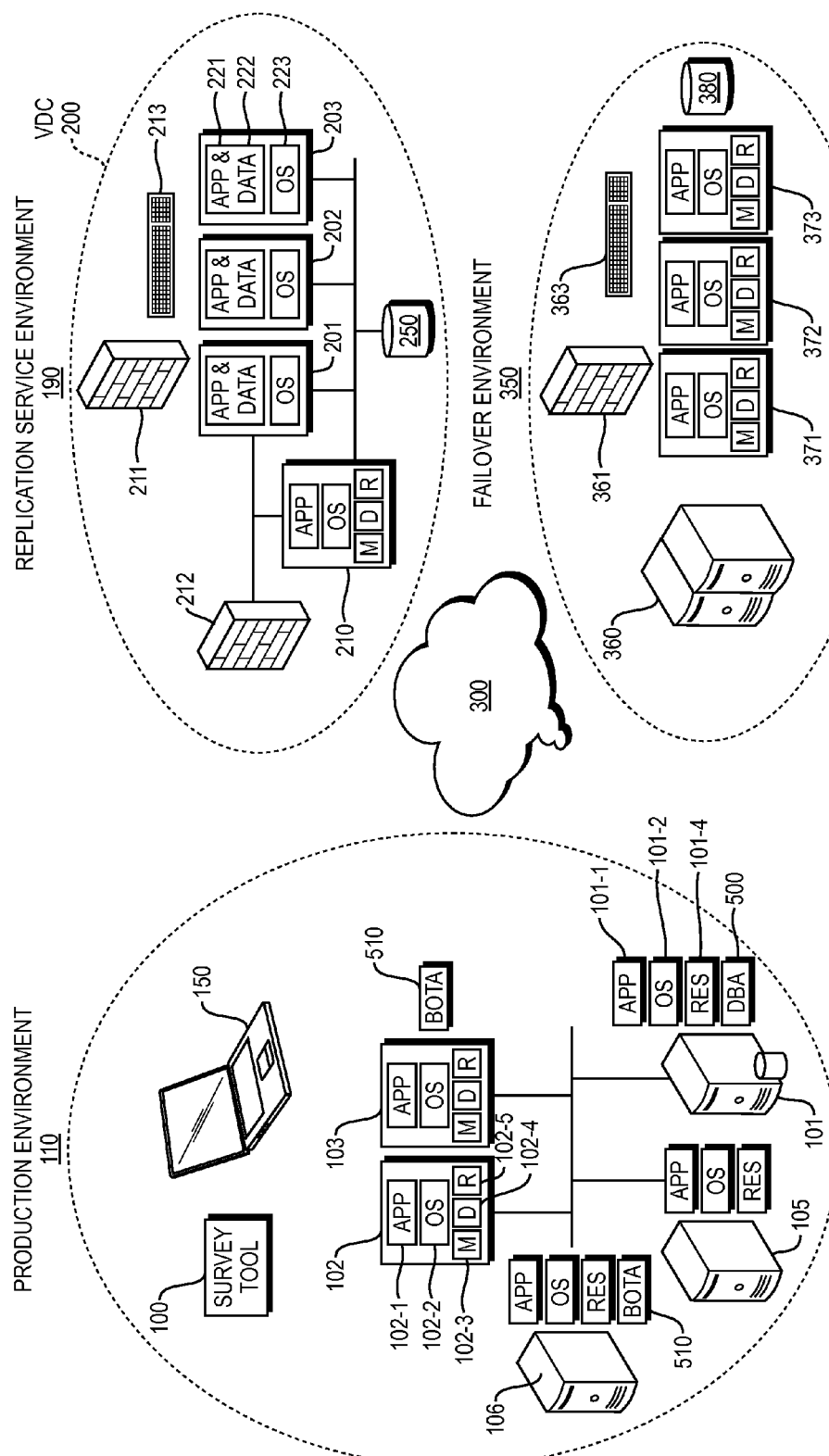
FIG. 1 illustrates a Virtual Data Center (VDC) that provides a Recover to Cloud (R2C) service to a customer operating one or more physical or virtual data processors in a production environment.

FIG. 1 is a high level block diagram of an environment in which apparatus, systems, and methods for operating a survey tool 100 for automatically discovering respective servers and server recover order in a Recover to Cloud (R2C) environment.

As shown, a production side environment 110 (that is, the customer's side from the perspective of a replication service provider) includes a number of data processing machines such as servers 101, 102, . . . , 106. The production servers may be physical machines 101, 105, 106 or virtual machines (VMs) 102, 103. An administrator node 150 initiates the survey tool 100 and provides access to certain functions as described below in more detail.

The production servers 101, 102, . . . , 106 may implement any sort of data processing function, such as a web server, database server, application server, media server, etc.—the specific end use of the servers is typically not important. An example production server 101 is a database server that has a database application program 101-1, operating system 101-2, and other data processor resources 101-4 such as memory, local storage, network connections, etc. An example VM 102 may include an application 102-1, memory 102-3, data 102-4 and other resources 102-5.

More specifically, the production servers 101, 102, . . . , 106 are connected to a wide area network (WAN) connection 300 such as provided by the Internet, a private network or other network to a replication service environment 190 that provides one or more Virtual Data Centers (VDCs) 200. The service customer does not really care where or how the VDCs 200 are implemented, and so from the customer's perspective, they are located at the service provider environment 190 and accessible in the network 300 cloud somewhere to provide a Recover to Cloud (R2C) service.

In such a virtualized computing environment with virtual machines operating in a cloud infrastructure, multiple computation stacks, including operating system, middleware, and applications, can operate together in a single server or set of servers. The cloud system(s) are therefore virtualized environments where virtual machines can elastically and dynamically scale to match the load or performance demands, where access to the cloud service is through a public network, and where the number and capability of virtual machines can be measured by the cloud provider and made available to the specifications of the customer using the cloud according to Service Level Agreements or other contractual arrangements.

In a typical scenario, an example VDC 200 includes a dedicated virtual physical 212 firewall 211, some specific VLANs 213, one or more dedicated storage devices 250 that may be high capacity storage network devices, one or more dedicated live virtual machines 210 and a number of dormant virtual machines (VMs) 201, 202, . . . , 203. An example dormant VM 203 includes at least an application 221, data 222, and an operating system 223, however other elements may also be defined. The dormant VMs may be in various file formats as specified depending on the type of virtual infrastructure utilized, such as VMware Virtual Machine Disk (VMDK) files, Amazon AMI files, Microsoft VHD files, or other suitable VM formats.

At least one of the VDCs 200 is a failover environment 350. It, too, has a physical machine 360, virtual machine definition files 371, 372, 373, virtual firewall(s) 361, and 363, storage 380, and other data processing devices. At a time of disaster (ATOD), the dormant VM definition files are transferred to one or more on-demand active physical machines 360 or active virtual machines 371, 372, . . . , 373 in the failover environment 350 forming part of the replication service environment 190. The failover environment 350 is also accessible to the customer via the cloud 300, preferably through a secure network connection such as may be provided by firewalls 361 or VLANs 363.

The specific mechanism(s) for replication and/or disaster recovery are not of particular importance to the present disclosure which is focused on how to determine an order in which the servers in the failover environment 350 should be restarted in the event of a failover in the production environment. It should also be understood that there may be a number of additional data processors and other elements of a commercial replication service such as recovery systems, storage systems, monitoring and management tools that are not shown in detail in FIG. 1, which are not needed to be specified in detail to understand the present embodiments.

As mentioned above, an example VM definition file specifies application programs data and an operating system. However, additional elements are required for each replicated dormant VM to be activated in the failover environment 350. These may include specific storage elements 380, network elements 363, security elements 361, and other elements that correspond to infrastructure and/or hardware that are necessary to actively operate the VMs such as VLAN IDs, firewalls, port groups in a VMware based environment, or other resources necessary to implement each machine needed in failover environment 350.

In the event of a disaster, the dormant VM files specified by the respective VM definition files are promoted to live VMs and access is provided to the customer in a replicated failover environment 350 via secure connections via the cloud 300. For these activated VMs, the service provider provides public IP addresses for those VMs which are public internet facing, and may also provide multiple VLAN IDs for the failed over VMs, and may also provide another dedicated resources such as a virtual firewall to support, for example, VLANs behind which the failed over virtual machines exist.

In order to determine the attributes of the VDC 200 to run in the failover environment 350, a survey tool 100 is run on administrative node 150 and automatically discovers at least some configuration information for the elements of the production environment 110. The configuration information may include identification of server(s), applications, storage, security and network device information for production environment 110. The configuration information is preferably determined automatically (such as through Simple Network Management Protocol (SNMP) messaging or custom Application Programming Interfaces (APIs) and stored in a configuration survey database on administrative node 150. The information automatically discovered may be augmented with manually entered information (such as server names).

However, even if the configuration of the various VMs 101, 102, 103 and physical machines 105, 106 can be determined, it is necessary to ascertain an order in which such corresponding replica machines should be brought on line in the failover environment 350. While this can be determined by having a user specify the same, some administrative users are not sophisticated enough to know what the order should be, or may make errors. It is therefore desirable if the order of activation can be determined at least semi-automatically.

Figure 2A:
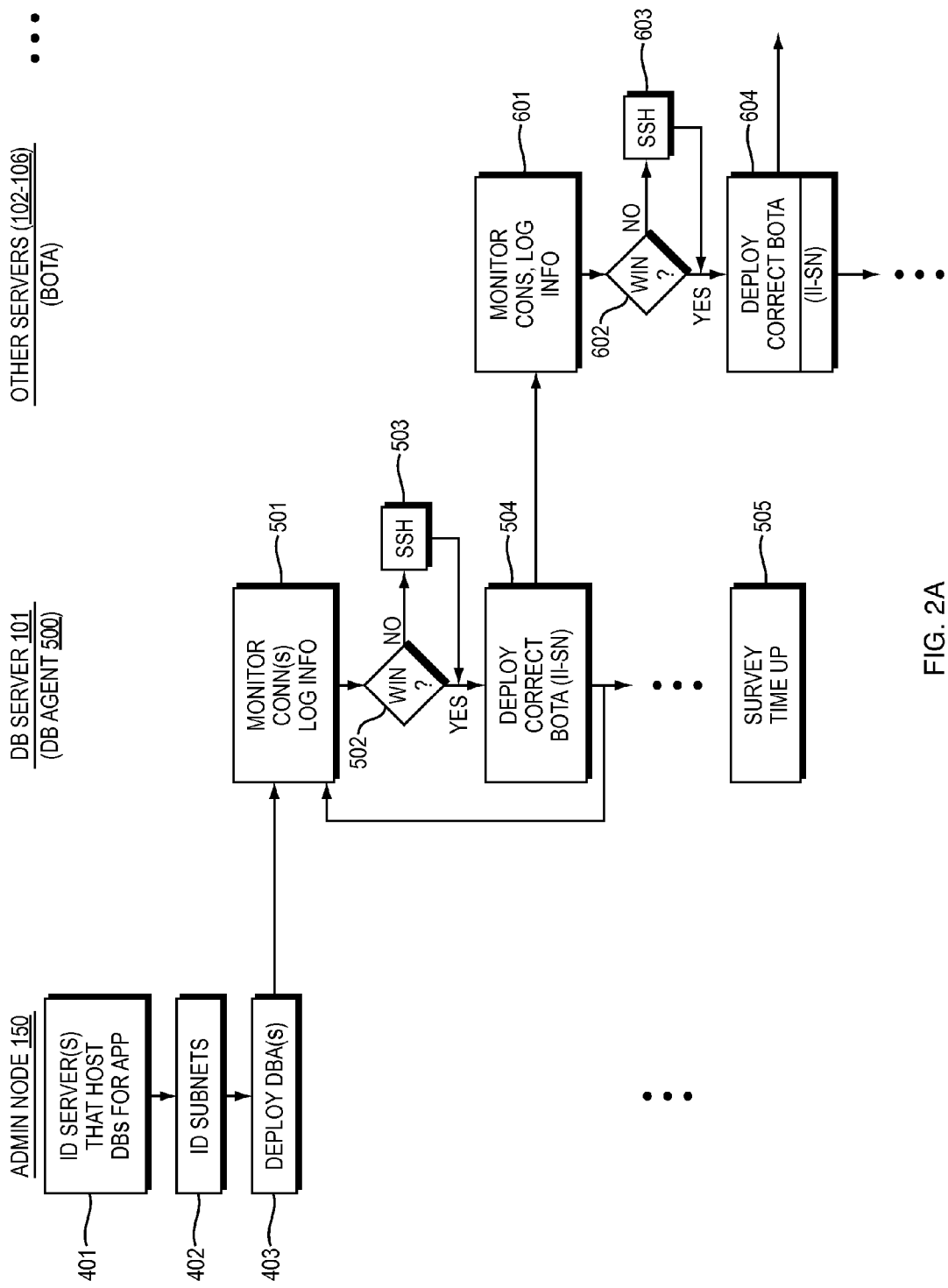
FIGS. 2A and 2B are flow diagrams of an automated process to discover which servers belong to an application to be recovered.
Figure 2B:
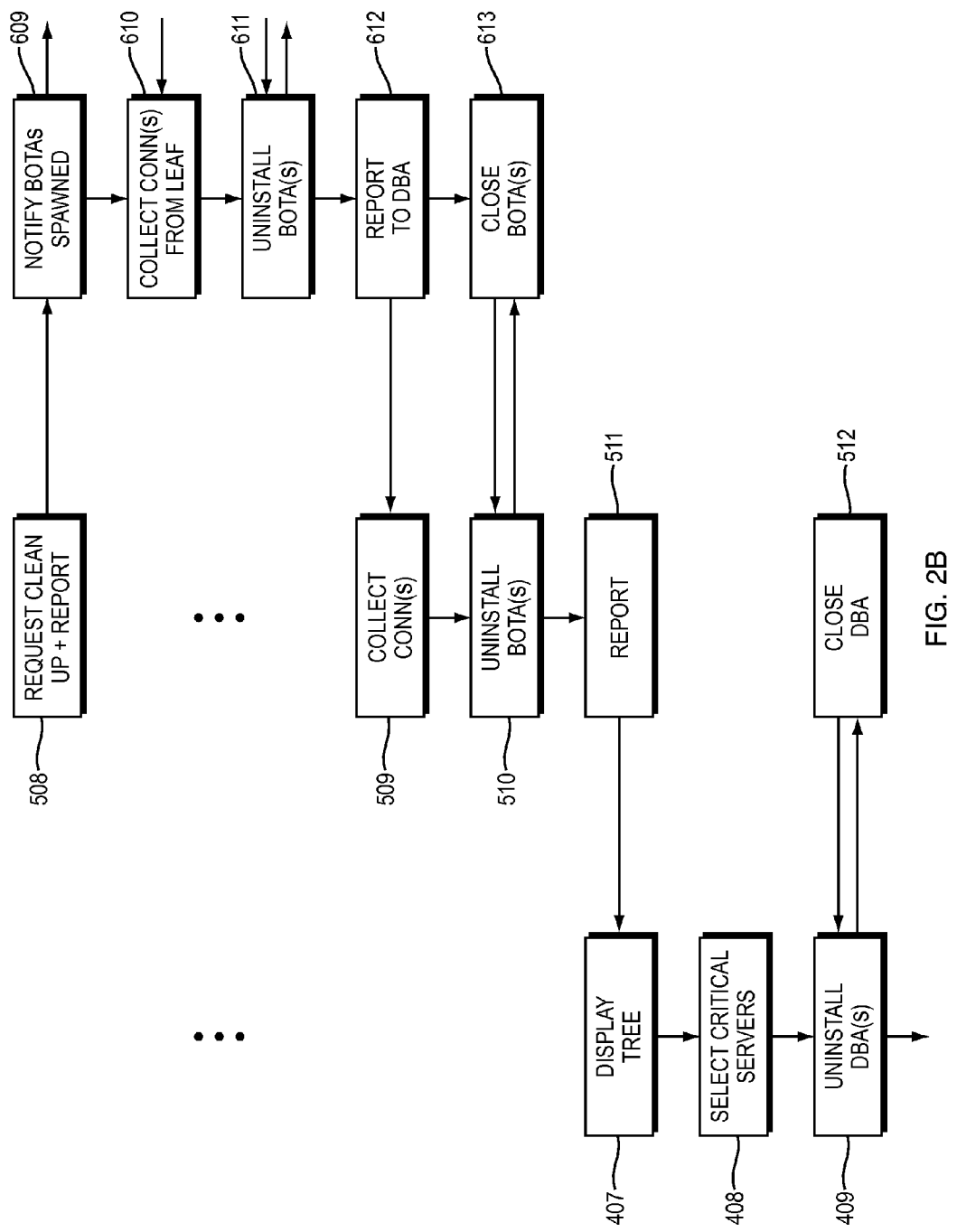

Turning attention now to FIGS. 2A and 2B the survey tool 100 process for determining server dependencies to recover a specific type of application (for example, a database application) will be described in more detail. It should be understood that an application being recovered typically will depend on more than one server 101, . . . , 106 in the production environment 110, but not all of them. Thus, there are two important elements of application recovery.

First, what are the various servers that belong to the application?

Second, what is the order in which those servers should be recovered and brought on line in the failover environment?

The processes of FIGS. 2A and 2B automates discovery of the various servers that could possibly belong to an application and the order in which those servers could possibly be recovered. Those potential recovery scenarios are then presented to the customer for verification and development of a specific recovery plan to be used for failover environment 350.

Referring to FIG. 2A more particularly, the customer has access to a administrator management node 150 and initiates the survey tool 100. The survey tool 100, at a first step 401, determines one or more servers that the administrative user already knows are accessed by the database application. This information can be provided through input from administrative user at management node 150 or collected in other ways. In the example of FIG. 1, the administrative user may know that his critical application of interest uses the database server 101 but is not sure whether any other servers are needed to recover the database application.

In an optional step 402, subnet identifies for the various servers known to belong to the application are identified and used as will be understood below. This step is used later to limit processing of the automatic discovery of a server dependency tree. Here the user may specify subnet addresses for machines located on a VLAN in the production environment 110.

In a next step 403 a database agent (DBA) 500 is deployed by the survey tool 100 on the particular server being examined, database server 101. The DBA 500 executes on database server 101 and monitors which other servers initiate connections to the database server 101. These other servers may be servers within the production environment 110 such as any or all of servers 102, 103, . . . , 106. Thus, for example, in state 501 the DBA 500 running on the database server 101 keeps track of specific information pertaining to other servers that initiate connects to the database server. This specific information may include a hostname, Internet Protocol (IP) address, whether the connection was a persistent or temporary connection, number of connections made in a given time frame, and other connection parameters.

As a first step 501 of DBA 500, DBA 500 therefore monitors connections that are made to it.

In state 502, the DBA 500 for example, then attempts to identify if the other server making a connection to the database server 101 is a windows or non-Windows machine. To do so, the DBA 500 may use a protocol such as Windows Management Instrumentation (WMI) for discovering if the other server is a Windows-based machine.

In state 503, if the other server is not a Windows machine, then the DBA 500 can use other protocols such as Secure Shell (SSH) to connect to the non-Windows server to determine for example, if it is a Linux, Solaris, AIX, HP or other server type.

In state 504, having determined the type of other server, the DBA 500 may then deploy another agent called a bot agent (BOTA) 510 herein, to the other server (e.g., server 103) that initiated the connection to the database server 101. The nature of the BOTA 510 deployed will vary depending upon the type of OS that the other server is using.

In a preferred embodiment, the BOTA 510 will only be deployed if the other server is within subnet(s) identified in state 402.

In state 601, the process now repeats, deploying a new BOTA on each newly discovered server. For example, the BOTA running on the other server monitors its own connections, keeping track of still other servers that initiate connections (e.g., in states 602, 603, etc.). This information maintained may again include host name, IP address, whether the connection is persistent or temporary, the number of connections in a given time frame and other connection parameters. The subnet information collected can also limit the iterative spiraling out of BOTA's to yet still other servers, so that when any newly discovered server is outside of the subnet address ranges specified, then a new BOTA will not be deployed in state 603.

The processes in states 501-504 and 601-604 are allowed to run for a relatively long period of time, such as a week, to ensure that all servers needed to support the application have been discovered.

Eventually, in state 505 sufficient time has passed for the DBA 500 and all BOTAs 510 that it is spawned to discover all other servers that connect to DB server 101.

A clean up process then begins as specified in FIG. 2B.

In state 508, the DBA 500 signals the first (highest or parent) level BOTA 510 that it is to initiate clean up and cease logging new server connections. The first level BOTA then informs (state 609) its next level BOTAs until eventually the bottom level (or leaf node) BOTA signals its corresponding parent that it is a leaf. The leaf BOTA then reports its collected server connection information to the parent and terminates. Its respective parent BOTA can issue an uninstall (in state 611) of the leaf BOTA.

The parent BOTA itself then eventually becomes a leaf reporting the leaf nodes that it discovered, the connections that it has collected from the leaf nodes, and its own connections. This process repeats (states 510, 613, etc.) until all BOTA's 510 are eventually terminated and all connection information is reported to the DBA 500.

At this point, in state 511 a report is made back to the administrative node 150 by the DBA 500 that has completed its task.

Figure 3:
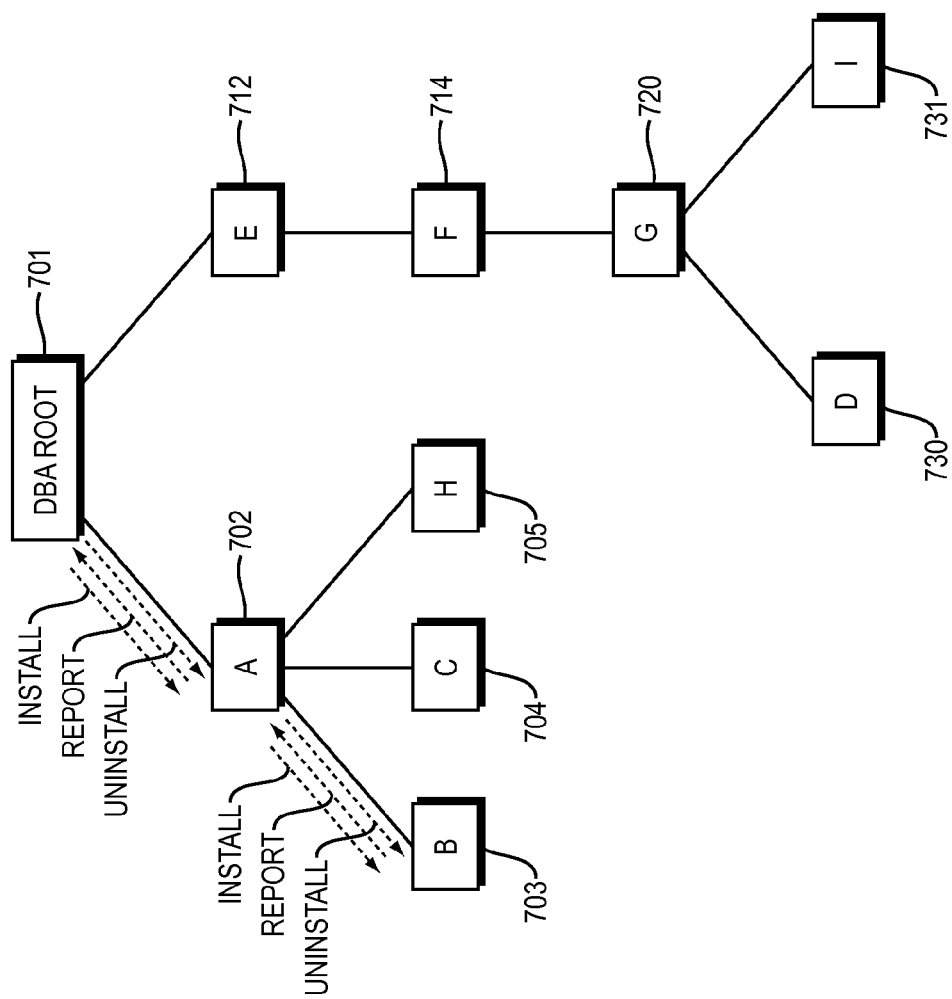
FIG. 3 is an example tree illustrating root and leaf nodes dependency.

This report may preferably result in a visual representation of the discovered structure of server connections such as may be represented in FIG. 3. In this particular example, a server A 702 and server E 712 are child nodes of DBA (root) server 701, with server A 702 have its own respective leaf node servers B, C and H (703, 704, 705). Server E 712 has a child server F 714 which in turn has child sever G 720, which in turn has leaf node 730.

The user interface may therefore allow the user to visualize all the discovered servers with the database as the root and all the servers that interacted with another and the direction of interaction. The display is of course, limited to those servers in the tree which were present in the subnets that the user originally specified. The discovered tree can typically be stored in administrative mode 150 for future reference FIG. 3 can also be consulted to understand the installation and uninstallation of BOTAs 510 as was described in FIGS. 2A and 2B above. The developed tree structure is traversed recursively beginning at the DBA root node 701 both when building the server connection model by spawning the BOTA processes, allowing them to work down to develop the tree (as per FIG. 2A) and then working up the tree from the leaf node(s) to uninstall them (as per FIG. 2B).

For example, when the BOTA 510 processes are being installed, the tree 700 is traversed until a leaf node such as node 703 is reached. The BOTA 510 running in node 703 reports itself and then when finished, signals its parent node 702 to uninstall itself. The parent node 702 uninstalls the BOTA from leaf 703. The parent node 702 (either before or after handing node 703) also discovers leaf 704 and waits for leaf 704 and then uninstalls its corresponding BOTA 510. Once node 702 has uninstalled all of its leaf nodes 703, 704, 705, it reports to its own parent (DBA root node 701) which in turn uninstalls node 702. This process repeats until only the DBA 500 remains. The user then typically uninstalls the DBA 500 from node 701.

While reviewing the graphical tree of FIG. 3, the administrative user reaches an optional state 408 (see FIG. 2B) where he selects which servers in the tree are actually critical enough to consider for replication and R2C services. Please note that even though the DBA 500 agent is uninstalled, the collected tree information will still remain in a file on administrative node 150. This way, the data center administrator can review the tree of FIG. 3 and can see the tree whenever he wants to even though the BOTA clean up process was done a while ago.

Figure 4:
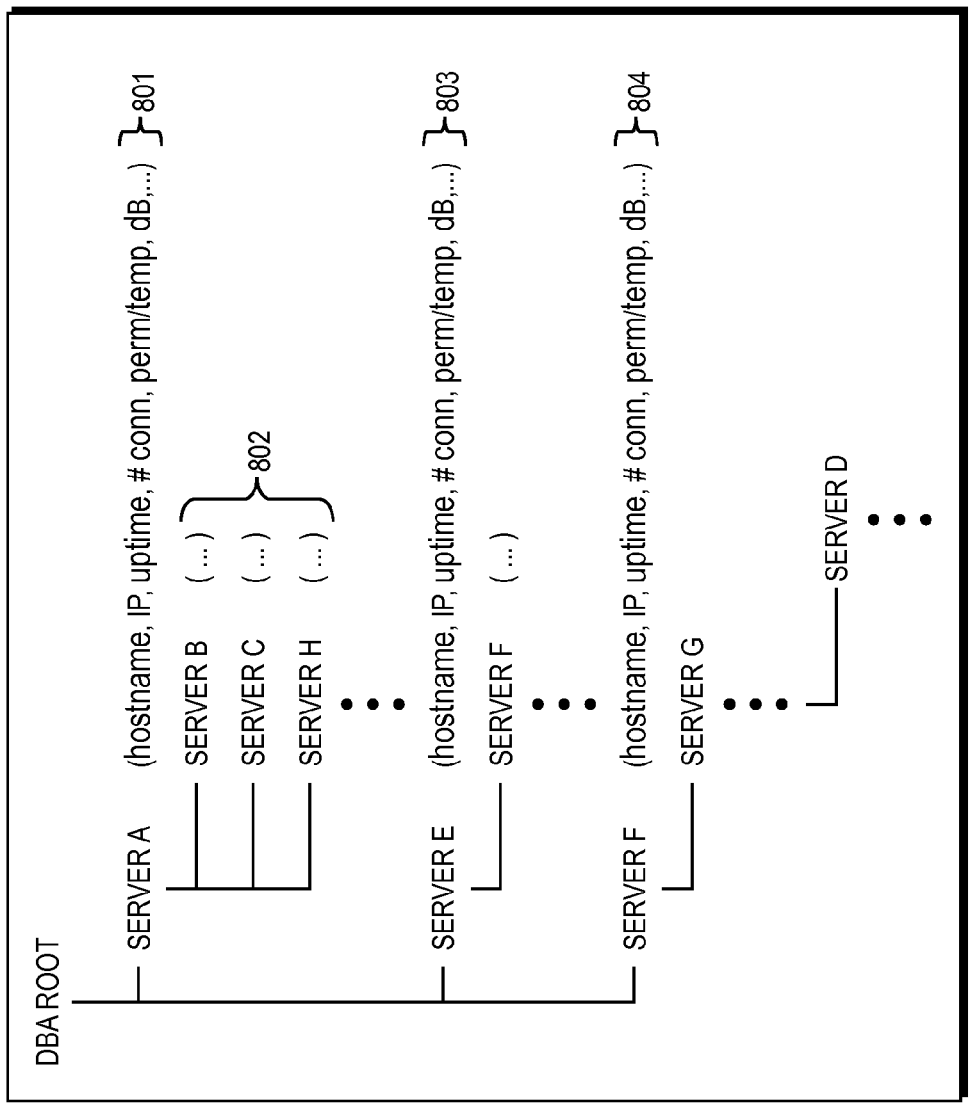
FIG. 4 is an example report of critical servers.

The result in FIG. 4 is a table, linked list, or other data structure listing the critical servers that have been discovered which belong to the database application, including an entry 801 representing the root database server 101, and other entries 801, 802, . . . , 804 representing all other servers to which the root server connects, any other servers to which those other servers connect which servers are leaf nodes, and so on down the tree of servers, and for which the user has decided such servers are critical enough to be included in the replication processes. Server A is an example entry in the table of FIG. 4. It may include a host name as well as IP address, uptime, number of connections, whether the connection is permanent or temporary, if a database is present, and so forth. The other server entries in the table may include similar information in the table entries about the other servers (servers B, C, D, etc.) but are not shown in detail in FIG. 4 for the sake of clarity.

Figure 5:
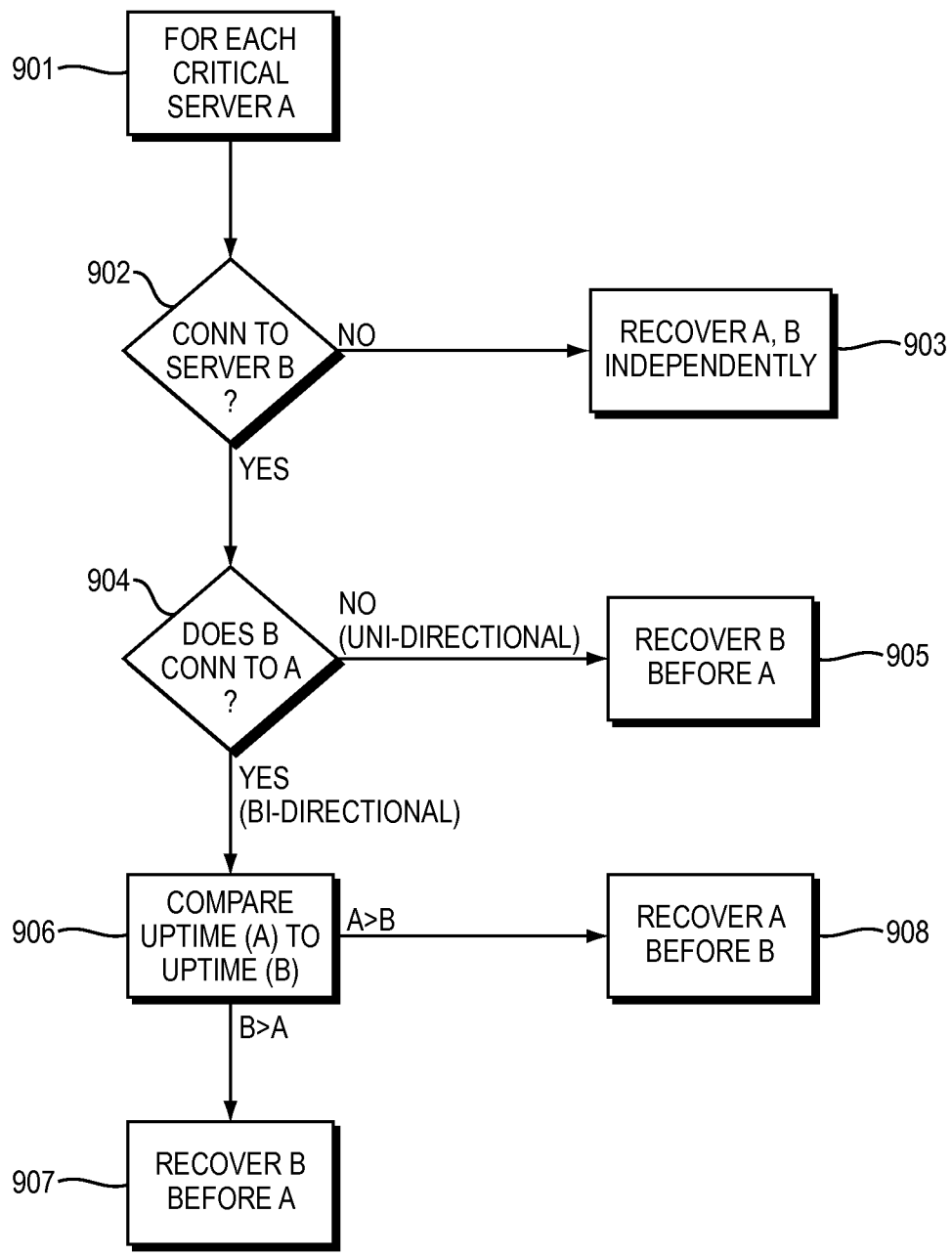
FIG. 5 is a flow diagram for a process of determining in which order servers should be recovered.

The next task for survey tool 100 is to determine an order in which the servers now need to be recovered by traversing the list of FIG. 4. FIG. 5 is sequence of operations that can be automatically executed to analyze the server table of FIG. 4. Briefly, the list is analyzed to determine if no communication was made between server pairs, unidirectional communication initiation was, or bi-directional communication was initiated.

In this example embodiment, a first state 901 is entered for an example critical server, such as Server A in the table of FIG. 4. In state 902, if no communication was made between Server A and another given server, such as Server B, it is concluded that these two servers are not dependent on one another for recovery order. It is then recorded that Server A and Server B can therefore be recovered in any order with respect to one another.

However, if in state 902 it is determined that Server A initiates a connection to Server B but that Server B never initiated a connection to Server A, then in state 905 it is recorded that Server B will need to be placed in a server order recovery table ahead of Server A somewhere.

Finally, in state 906 where Server A initiates connections to Server B and Server B also initiates connections to Server A, then the recovery order process takes additional steps. In particular a boot order must be determined so that one can suggest which server needs to be recovered first. This can be determined by consulting a system up time for each of Server A and Server B. If for example, the system up time of Server A is smaller than the uptime of Server B then most probably Server B needs to be booted first.

There is a possibility of cyclic dependency where the logic could deduce that Server A depends on B, B depends on C, and C depends on A. In these situations the server that has a database installed would be assigned a higher priority, or weight, of being the first to be recovered. A greater weight would be provided to server that had the longer system up time. The weights of both the presence of database and the weigh of system up time could also be combined to calculate the order of recovery.

Eventually a server order recover table 1000 is thereby determined as shown in FIG. 6 with a particular sequence of servers and their dependencies. This server recovery table is then consulted in a disaster recovery or disaster test situation to determine the order in which the replicated servers in the VDC 200 must be brought online and go live in the recovery environment 350 of FIG. 1.

The server order recovery table 1000 not only specifies a list of Servers H, I and J have been given order "0", meaning they are not dependent on other servers and thus can be recovered at any time. So, for example, in a system with ten total servers A-J, an example server named "Server A" must be recovered first. Servers B, C and D are all of order "2", so they may not be recovered and recovered together. Similarly, Servers E, F, and G are order "3" and can be recovered together, but only after Servers B, C and D are recovered.

The teachings of all patents, published applications and references cited herein are incorporated by reference in their entirety.

It should be understood that the example embodiments described above may be implemented in many different ways. In some instances, the various "data processors" described herein may each be implemented by a physical or virtual general purpose computer having a central processor, memory, disk or other mass storage, communication interface (s), input/output (I/O) device(s), and other peripherals. The general purpose computer is transformed into the processors and executes the processes described above, for example, by loading software instructions into the processor, and then causing execution of the instructions to carry out the functions described.

As is known in the art, such a computer may contain a system bus, where a bus is a set of hardware lines used for data transfer among the components of a computer or processing system. The bus or busses are essentially shared conduit(s) that connect different elements of the computer system (e.g., processor, disk storage, memory, input/output ports, network ports, etc.) that enables the transfer of information between the elements. One or more central processor units are attached to the system bus and provide for the execution of computer instructions. Also attached to system bus are typically I/O device interfaces for connecting various input and output devices (e.g., keyboard, mouse, displays, printers, speakers, etc.) to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

The computers that execute the processes described above may be deployed in a cloud computing arrangement that makes available one or more physical and/or virtual data processing machines via a convenient, on-demand network access model to a shared pool of configurable computing resources (e.g., networks, servers, storage, applications, and services) that can be rapidly provisioned and released with minimal management effort or service provider interaction. Such cloud computing deployments are relevant and typically preferred as they allow multiple users to access computing resources as part of a shared marketplace. By aggregating demand from multiple users in central locations, cloud computing environments can be built in data centers that use the best and newest technology, located in the sustainable and/or centralized locations and designed to achieve the greatest per-unit efficiency possible.

In certain embodiments, the procedures, devices, and processes described herein are a computer program product, including a computer readable medium (e.g., a removable storage medium such as one or more DVD-ROM's, CD-ROM's, diskettes, tapes, etc.) that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transient machine-readable medium may include read only memory (ROM); random access memory (RAM); magnetic disk storage media; optical storage media; flash memory devices; and others.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

It also should be understood that the block and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A data processing system for replication of a production data processing environment, the production environment including at least one production data processor and at least one production networking device, the system comprising:
   (a) a virtual data center (VDC) including at least one dedicated live virtual machine (VM), at least one dedicated replication networking device, and two or more dormant VM definitions for storing replicated data received from the production environment representing corresponding two or more physical or virtual machines in the production environment;
   (b) one or more physical hardware processing machines, for executing program code, the program code including
      (i) an automated survey tool to determine the physical or virtual machines which belong to an application associated with the production environment;
      (ii) an automated connection monitor tool for determining connection dependencies among the physical or virtual machines in the production environment, and from the connection dependencies, determining a replica machine recovery order;
      (iii) a replication process for receiving replicated data from the production environment and writing the replicated data to dormant VM definitions in the VDC, while the production environment is in operation; and
      (iv) a failure recovery process for activating the VDC for access in place of the production environment by promoting the dormant VM definitions to live VMs in an order specified by the replica machine recovery order wherein the replica machine recovery order is further determined by processing a list of physical or virtual machines that comprise servers in the production environment and associated connections such that
      if two servers, Server A and Server B, have not initiated connections to each other, then they are not determined as dependent on each other for the replica machine recovery order;
      if Server A has initiated a connection to Server B, but Server B has not initiated a connection to Server A, then Server B is placed before Server A in the replica machine recovery order; and
      if Servers A and B each initiate connections to one another, an uptime for Server A is compared to an uptime for Server B to determine the replica machine recovery order.

2. The system of claim 1 wherein the connection monitor tool further deploys an agent process in an application server in the production environment associated with a particular application, the agent process logging connection requests made to the application server by one or more other servers.

3. The system of claim 2 wherein the agent process deploys a further agent process to the one or more other servers to in turn discover connection requests made to the one or more other servers by one or more still other servers.

4. The system of claim 3 wherein the further agent process is not deployed if at least one of the still other servers is located outside of a specified subnet.

5. The system of claim 3, wherein the agent process signals the further agent process to terminate connection discovery.

6. The system of claim 5 wherein a clean up agent traverses the connection requests to discover a leaf node, and the leaf node then signals a corresponding parent node to uninstall an agent process in the leaf node.

7. The system of claim 6 wherein the clean up agent traverses the connection requests until only an initial agent process remains active.

8. The system of claim 1 further comprising:
   presenting an administrative user with a tree display of discovered servers and connection dependencies.

9. The system of claim 1 further comprising:
   accepting user input as to which discovered servers are to be replicated for failover recovery.

10. The system of claim 1 wherein if a cyclic dependency exists among a connection order for two or more servers, a respective uptime and/or earlier recovery of a specific application server type are used to resolve the replica machine recovery order.

11. In a data processing system including a production environment comprising one or more physical and/or virtual machines, a method comprising:
    determining connection dependencies among the physical and/or virtual machines in the production environment;
    determining a recovery order by the further steps of:
    deploying an agent process in an application server in the production environment associated with a particular application, the agent process logging connection requests made to the application server by one or more other servers;
    the agent process in turn further deploying a further agent process to the one or more other servers to discover still additional connection requests made to the one or more other servers, by at least one still other server; and
    wherein the recovery order is determined by processing a list of physical or virtual machines that comprise servers in the production environment and associated connections such that:
    if two servers have not initiated connections to each other, they are determined to not be dependent on each other for the recovery order;
    if a first server has initiated a connection to a second server, but the second server has not initiated a connection to the first server, then the second server is placed before the first server in the recovery order; and
    if the first and second server have each initiated connections to one another, an uptime for the first and second servers is compared to determine the recovery order.

12. The method of claim 11 wherein the further agent process is not deployed if the still other server is located outside of a specified network.

13. The method of claim 12 wherein the connection requests made to the application server and the still additional requests made to the one or more other servers as discovered by the further agent processes are stored in the form of a connection tree.

14. The method of claim 13 wherein a clean-up agent traverses the connection tree to discover a leaf node, and the leaf node signals a corresponding parent node to uninstall an agent process from the leaf node.

15. The method of claim 11 further comprising:
    accepting user input as to which discovered servers are to be replicated.

16. The method of claim 11 wherein if a cyclic dependency exists among two or more servers in the recovery order, at least one of uptime and/or the need for earlier recovery of a specific application and/or server type are used to resolve the recovery order.

17. An apparatus for providing disaster recovery of a production data processing environment, the production environment comprising two or more physical or virtual machines to be replicated in a failover environment, the apparatus comprising one or more physical data processing machines that retrieve instructions from one or more stored media and execute the program instructions, the program instructions for:

determining connection dependencies among the physical and/or virtual machines in the production environment; and determining a recovery order by the further steps of:

deploying an agent process in an application server in the production environment associated with a particular application, the agent process logging connection requests made to the application server by one or more other servers; and the agent process in turn further deploying a further agent process to at least one of the one or more other servers to discover still additional connection requests made to the one or more other servers, the still additional connection requests made by still other servers, wherein a recovery order is determined by processing a list of physical or virtual machines that comprise servers in the production environment and associated connections such that:

if two servers have not initiated connections to each other, they are determined to not be dependent on each other for the recovery order;

if a first server has initiated a connection to a second server, but the second server has not initiated a connection to the first server, then the second server is placed before the first server in the recovery order; and if the two servers each initiate connections to one another, a respective uptime is used to resolve recovery order or earlier recovery of a specific application type.

* * * * *